United States Patent Office 3,344,528
Patented Oct. 3, 1967

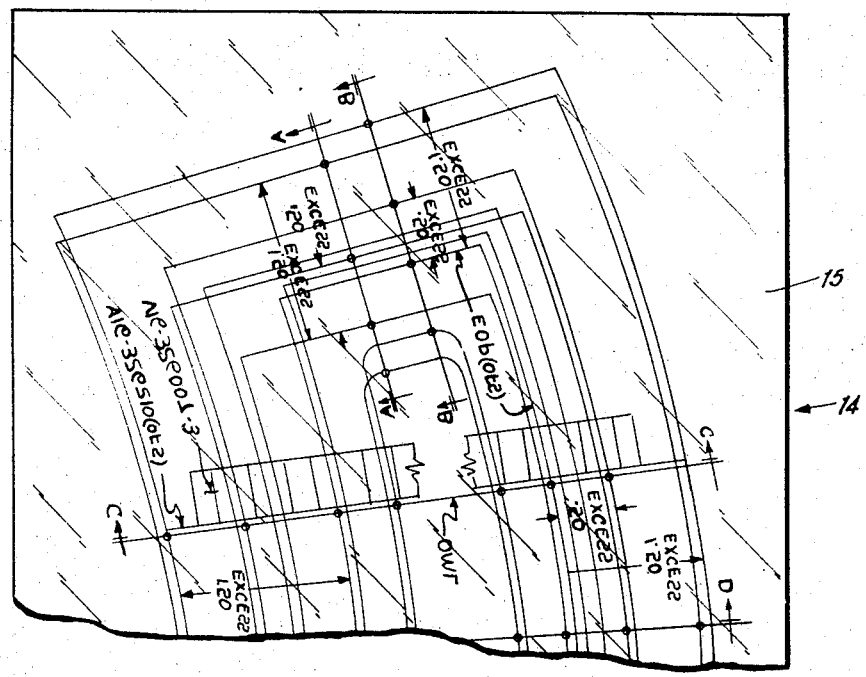
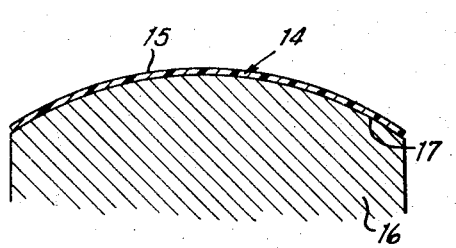
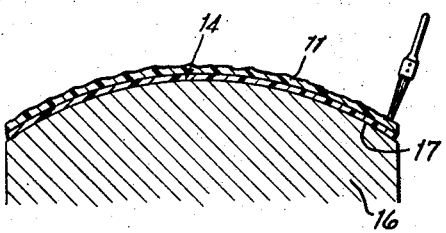
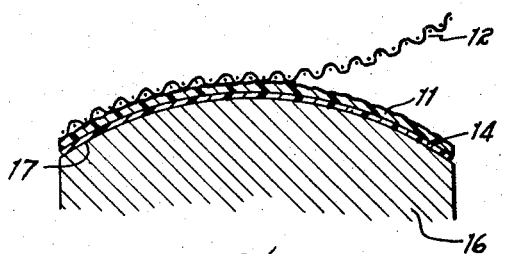

3,344,528
ARTICLE HAVING AN EPOXY SURFACE WITH AN IMAGE IMPREGNATED THEREIN
Cary Purdum and Howard W. Gibney, Middletown, Ohio, assignors to Aeronca, Inc., a corporation of Ohio
Original application June 4, 1963, Ser. No. 285,345. Divided and this application Sept. 23, 1964, Ser. No. 398,587
7 Claims. (Cl. 33—174)

ABSTRACT OF THE DISCLOSURE

A plastic article or tool having a cured epoxy resin surface with image areas impregnated in and extending below the epoxy surface. The image areas are permanently immobilized in the epoxy surface and are unaffected by abrasion, heat and solvents to which the epoxy surface is normally capable of being subjected due to its thermoset characteristics.

---

This invention relates to a novel article of manufacture and is particularly directed to an article having an epoxy surface and an image impregnated in the surface and extending below the surface. This is a divisional application of our pending United States patent application Ser. No. 285,345, filed June 4, 1963, which is directed to the method of forming such articles.

At the present time it is conventional in connection with various manufacturing operations, such as the fabrication of aircraft and missile components, to provide full-scale plastic tools or fixtures. These tools are frequently formed of a dimensionally stable epoxy resin. The working surface of the plastic tool may be relatively large, e.g., 50–100 square feet. This surface is frequently marked with a series of drawings, dimension lines and the like, used for example to check details, to align parts during a lay-up operation, and to check a finished assembly.

In the past these drawings have been made by hand, or by securing an adhesive-backed Mylar sheet over a master pattern, or by complex photographic methods. Each of these prior art approaches to the problem of transferring control information onto a plastic sheet has inherent disadvantages.

Specifically, the manual transfer of any sizable quantity of information is laborious and time consuming. For example, to place the requisite information on one typical tool required the services of two skilled men for five days. This method has the additional, very serious drawback that the necessary accuracy is difficult to obtain and the work must be carefully checked to catch any human errors.

The method involving the physical adhesion of a Mylar sheet to a surface is of limited application since it can be used only on tools of small size, i.e., less than a square foot. Also, in this method the information does not become a permanent part of the tool fixture. Rather, after a period of use the sheet may tend to shift relative to the fixture and the control lines may become obliterated so that the sheet must be replaced.

The photographic method is disadvantageous because it is limited to flat surfaces and requires very expensive equipment. For example, a typical installation for transferring images photographically may cost well in excess of $150,000.

The present invention is directed to a novel method of transferring an image onto a plastic surface so that the image is transferred with extreme accuracy and becomes a permanent integral part of the plastic surface onto which it is transferred.

More particularly, the present invention is predicated upon the empirical discovery and determination that an image can be transferred to certain resins as an adjunct to the step of polymerizing, or curing, the resin. The transfer is effected without the use of any external heat or pressure. Essentially, the present process entails the steps of forming an image on a carrier sheet with a suitable dye, placing an uncured mixture of a resin and curing agent in contact with the carrier sheet and maintaining the resin in contact with the sheet during the curing period. After the resin has cured, the carrier and plastic are separated. A duplicate of the image formed on the carrier sheet is left on the surface of the plastic material. This image is actually embedded in the surface of the plastic and is unaffected by solvents or normal abrasion.

In one preferred mode of carrying out the present method, the information to be transferred is originally formed as an image on an ammonia developed diazo sensitized Mylar film. This film is placed over a master model and is covered with an epoxy resin mixed with a polyamine type curing agent. As the epoxy is cured, the image is transferred from the Mylar sheet to the epoxy surface.

While the exact mechanism of the present transfer is not fully understood, it is believed that the dye used in forming the image dissolves in the curing agent. For example, when as in the above example a polyamine is employed as a hardener, the polyamine has active amine ($NH_2$) radicals. These amine radicals act as solvents for various dyes, including aniline dyes and the diazo dyes forming the image on the sheet described above. These dyes are thus transferred from the carrier sheet and carried into solution in the curing agent. However, the amines of the curing agent also are effective to cross link with, and hence polymerize, the epoxy resin so that the transferred image becomes immobilized in the epoxy and subsequently a film of polymerized resin is formed over the image to protect it from abrasion, solvents and the like.

One of the principal advantages of the present invention is that the image transferred onto the plastic surface is identical with the image formed on the carrier sheet. That is, in the finished article the image transferred is sharp and coincides dimensionally with the master image on the carrier sheet.

A still further advantage of the present invention is that the image formed is extremely permanent. Even after a tool provided with an image in accordance with this invention has been used for an extended period of time, the image remains sharp and clear. The image is not affected by abrasion, solvents, heat or the like, to which a plastic tool is normally subjected.

Another extremely important advantage of the present invention is that the article is simple and economical to produce and requires practically no production time additional to that involved in forming an unmarked plastic tool.

Still another advantage of a preferred article of the present invention produced using an image formed on a Mylar sheet is that the surface of the article is extremely smooth. This smoothness is imparted by the Mylar sheet which serves as an image carrier and as a parting agent between the plastic member and the master pattern. This sheet imparts a very smooth finish to the plastic member and completely eliminates the need to resurface the master pattern before the plastic tool is formed.

While the present invention is particularly advantageous in connection with the transfer of control information onto plastic tools and fixtures in which environment dimensional stability and sharpness are critical factors, it is to be understood that the present invention is of broader scope and that the invention is useful in connection with the production of decorative plastic articles, and the like, in which dimensional stability and image sharpness are not prime requisites.

These and other objects and advantages of the present invention will be more readily appreciated from the following detailed description of the drawings illustrating one product manufactured by the present invention and one preferred mode of carrying out the present method.

In the drawings:

FIGURE 3 is a partial view of the sensitized surface of a Mylar sheet carrying the information transferred to the fixture.

FIGURE 4 is a semi-diagrammatic cross sectional view showing the Mylar sheet in place over a master pattern.

FIGURE 5 is a semi-diagrammatic cross sectional view showing a layer of resin being placed over the Mylar sheet.

FIGURE 6 is a semi-diagrammatic cross sectional view similar to FIGURE 4 showing the step of placing a glass cloth over the resin layer.

Figure 1:
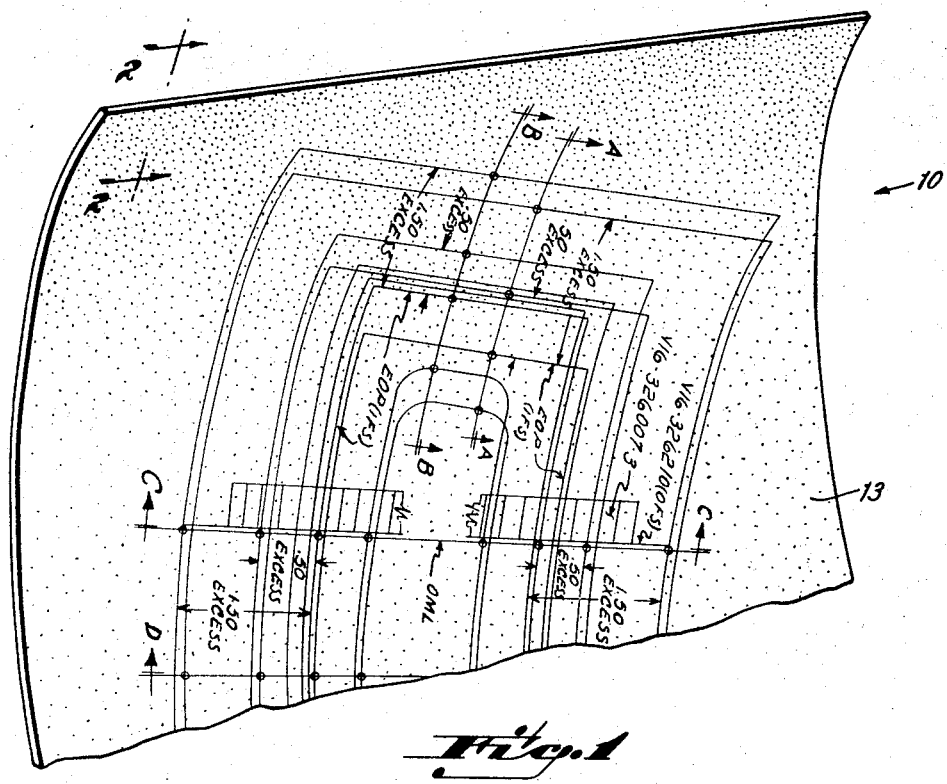
FIGURE 1 is a partial perspective view of a curved plastic fixture having tooling information placed on the surface thereof by means of the present invention.
Figure 2:
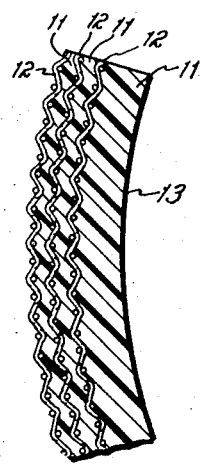
FIGURE 2 is a cross sectional view taken along line 2—2 of FIGURE 1.

FIGURE 1 shows a typical plastic tool 10 fabricated in accordance with the principles of the present invention. More particularly, tool 10 is formed from laminated layers of an epoxy resin 11 and glass cloth 12. The tool has a smooth working surface 13. The surface of the particular embodiment shown is a simple curve of precise contour. It is to be understood that the present method can also be utilized to transfer images onto plane surfaces and surfaces having a mild compound curvature. The working surface 13 of tool 10 is provided with a plurality of lines, dimensions and other control information for the fabrication of a brazed metal assembly. It is to be understood, however, that the present invention is not limited to the transfer of such control information, but can also be used for the transfer of other images, such as decorative patterns.

In the tool 10 of FIGURE 1, the lines are sharp black lines on a white background and are positioned to a high degree of accuracy, for example plus or minus five thousandths of an inch on a ten inch grid with no cumulative error. Moreover, a plurality of tools can be made identical with tool 10 and each will be within the same range of accuracy.

A preferred method of fabricating a tool, such as tool 10, is best shown in FIGURES 3–6. In accordance with this method, a full-scale tooling master layout (not shown) is exposed to a diazo sensitized Mylar sheet 14, or the like, on a vacuum light table. One suitable form of diazo sensitized Mylar sheet is produced by Keuffel & Esser and is identified as K & E Stabilene Sheet #45–1505 (formerly #465D). One surface 15 of this sheet is coated with a dry diazo polyester film coating composed of diazo sensitizers and couplers in a polymeric matrix. The diazo sensitized surface 15 of this sheet is dry developed by a direct contact ammonia process. The image formed on this sheet is an exact mirror image of the original layout and is also an exact mirror image of the layout to be placed on working surface 13 of tool 10.

In the next step, Mylar carrier sheet 14 is placed over a master model 16. This master model 16 may be formed of plaster, or the like, and includes an accurately contoured surface 17 which corresponds exactly to the desired contour of working surface 13 of the plastic tool 10. The Mylar sheet 14 is accurately positioned relative to the master model by suitable datum and control lines forming part of the image on the Mylar sheet corresponding datum and control lines placed upon the master pattern. Before the Mylar sheet is placed over the master pattern, the master pattern is coated with a suitable material, such as petroleum jelly, for adhesively holding the Mylar sheet in position. Then the Mylar sheet is placed over the master pattern with the sensitized surface 15 exposed and the datum and control lines on sheet 14 and surface 17 exactly superimposed. The Mylar sheet is rolled outwardly from the center of the sheet to remove entrapped air and surplus petroleum jelly. With the Mylar sheet so positioned, the flat pattern Mylar layout is configurated in the true shape and development of the assemblies to be produced utilizing tool 10.

In the next step of the process a parting agent is applied to the exposed surface 15 of the Mylar sheet. One suitable form of parting agent is standard paste floor wax. Thereafter, as is shown in FIGURE 5, a mixture of epoxy resin and curing agent are applied over the Mylar sheet. One suitable form of epoxy is produced by Ren Plastic Company under the trademark RP1710. RP1710 resin contains about 70% of a mixture of epoxy resin; essentially, a diglycidyl ether of the 2-2-(4-4' dehydroxydiphenyl) propane with a hydroxy equivalent range of 182–220, with butyl glycidyl ether plus 30% fillers and pigments. This resin is mixed in a stoichiometric ratio of five parts resin with one part RP1710 hardener. (The exact amounts of hardener may vary from 10% less than the above ratio to 25% more than the ratio). RP1710 hardener contains about 85% of a modified aliphatic polyamine of the type of N-hydroxylpropyl triethylenetriamine plus 15% of a mixture of diphenols of the type of 2-2-(4-4' dehydroxydiphenyl) propane and less than .1% of an odor counteractant.

This epoxy resin and hardener mixture is coated over the Mylar sheet at room temperature. Next, a layer of 12 ounce glass fabric is placed over the epoxy resin. Subsequently, another layer of epoxy resin is coated over the fiber and another sheet of glass fiber is placed on top of the second epoxy layer. Finally, a third epoxy layer is placed over the second glass fabric and the third layer of glass fabric is placed over this epoxy layer. Thus, an epoxy resin-glass fabric laminate is built up to the order of approximately three-eighths to one-half inch. The thickness of this laminate is not critical and can be varied in accordance wtih the desired strength of the finished plastic tool. It is to be noted that the only force holding the epoxy resin and Mylar sheet in contact is the weight of the epoxy resin and glass fiber which is of the order of only one-fourth of a pound per square foot. The present method of transfer depends only upon contact and does not require any appreciable pressure between the resin and Mylar sheet.

The resin is now cured at room temperature for a period of approximately twelve to eighteen hours. During this time a small portion of the diazo dye forming the lines of the image on Mylar sheet 14 is dissolved by the amine of the hardener. This dye is transferred into the epoxy. At the same time, the amines cross link with the epoxy resin to polymerize that resin and immobilize the dye. A thin transparent film of polymerized resin also forms over the transferred image.

After the curing cycle, the tool 10 is removed from the master pattern 16 and the Mylar film is stripped from the working surface 13 of the tool. The surface 13 now contains a complete mirror image of the information contained on the Mylar sheet. The working surface 13 of the tool is exceedingly smooth since this surface has in effect been cast against the smooth Mylar surface. Mylar sheet 14 is removed intact and can be used in a similar way to again transfer the image formed on surface 15 to another plastic tool; or alternatively the sheet can be used for other control purposes. It has been empirically determined that the image from one Mylar sheet of the type disclosed can be transferred by the present process several times. However, the image becomes progressively less distinct so that as a practical matter it is usually preferable to make a Mylar carrier sheet for each tool 10 to be produced.

The completed tool 10 can be used to check individual components by placing the components over the tool. The tool can also be utilized in laying up components prior to a brazing operation. Finally, after the assembly has been brazed, the tool 10 can be utilized to check the final assembly. Since the image is impregnated in, or lies under the surface of the tool, the image remains completely legible even after protracted periods of use and is not adversely affected by normal abrasion, or by heat (for example, some parts are brought into contact with a tool at 180° F.) by solvents used to clean the tool or by oils and solvents inadvertently dropped onto the tool. The above described embodiment is particularly advantageous because the image obtained is an exceedingly sharp black image on an off-white surface. Very high dimensional accuracy is achieved.

Other resin materials which can be employed satisfactorily in the present process include an epoxy resin produced by Shell Oil Company under the trademark Epon 828. This is a low molecular weight condensation product of epichlorohydrin and bisphenol-A. In one embodiment, 60% by weight of Epon 828 resin is mixed with 40% by weight of a curing agent. One suitable form of curing agent consists of equal parts by weight of General Mills Versamid 125 and Versamid 115. These Versamids are polyamide resins produced as a reaction product of dimer acids from vegetable oils with polyamines. Versamid 115 has an amine value of 210–230 and a viscosity of from 500–750. Versamid 125 has an amine value of from 290–320 with a viscosity of from 80–120. The Epon 828 epoxy and the Versamid curing agents are used in the process described above in place of the Ren RP1710 resin and curing agent. Epon 828 is cured in contact with the Mylar sheet at room temperature for a period of from eight to ten hours.

Still another epoxy resin which can be used is Resolin E–90 epoxy produced by Resolin Inc. This epoxy can also be cured using an equal mixture of Versamid 125 and 115. Another epoxy which can be used is Ren epoxy RP1120. This epoxy is cured by Ren epoxy curing agent RP1120.

Other carriers which can be employed in place of K & E diazo sensitized Stabilene Mylar sheet is a similar diazo sensitized Mylar sheet produced by Eugene Dietzgen Co. as Dietzgen Diazo Sensitized sheet material F247E.

However, the present invention is not restricted to the transfer of images from a Mylar surface. For example, images can be transferred from paper, such as tracing paper, kraft paper and the like. These images can be drawn by pen, brush or the like, using suitable dyes or inks containing a dye soluble in amines. Such dyes include azo dyes and aniline type dyes. Among these dyes are Watchung red R155T and Ruber red 2BD produced by Du Pont Company substantially like pigments 48 and 78 in the "Colour Index" respectively, Rubine red 338 produced by Harshaw Company and "Marks-A-Lot" ink produced by Carters, Inc. The use of such dyes enables colored images, such as decorative patterns, to be transferred as well as the black and white images referred to above. However, the transferred images using some of these dyes may tend to blur slightly in comparison to the exceedingly sharp images produced using the materials of the first example described above.

From the above disclosure of the general principles of the present invention and the above description of several modes of practicing the invention, those skilled in the art will readily comprehend various modifications to which the invention is susceptible. Accordingly, we desire to be limited only by the scope of the following claims.

Having described our invention, we claim:

1. A plastic tool having a cured epoxy resin working surface of predetermined contour with image areas comprising control information impregnated in and extending below said working surface, said image areas characterized by being sharp and completely legible against non-image background areas of said surface, said image areas being immobilized in said surface and forming a permanent integral part of said surface whereby said image areas are unaffected by abrasion, heat and solvents to which said epoxy tool would normally be subjected in use.

2. A plastic tool as defined in claim 1 wherein said tool comprises a laminate of glass fiber sheets and a cured epoxy resin.

3. A plastic tool as defined in claim 1 wherein said cured working surface comprises an epoxy resin and an epoxy curing agent and said image areas are formed by a dye.

4. A plastic tool as defined in claim 3 wherein said curing agent is an amine selected from the group consisting of polyamines and polyamides and said dye is selected from the group consisting of azo and analine dyes.

5. As a new article of manufacture, an article having a cured epoxy resin surface with an image impregnated in and extending below said surface, said image characterized by being clear and completely legible against a non-image background area of said surface, said image being immobilized in said surface and forming a permanent integral part of said surface whereby said image is unaffected by abrasion, heat and solvent action to which said cured epoxy surface is normally capable of being subjected by reason of its thermoset characteristics.

6. As a new article of manufacture, an article as defined in claim 5 wherein said article comprises a laminate of glass fiber sheets and a cured epoxy resin.

7. As a new article of manufacture, an article as defined in claim 5 wherein said cured epoxy surface comprises an epoxy resin and an amine curing agent for said resin selected from the group consisting of polyamines and polyamides, said image is formed by a dye selected from the group consisting of azo and analine dyes.

References Cited

UNITED STATES PATENTS

| | | | |
|---|---|---|---|
| 2,471,395 | 5/1949 | Keuffel | 33—137 |
| 2,514,437 | 7/1950 | Bailhe | 33—126.5 |
| 3,256,109 | 6/1966 | Berger | 117—38 |

SAMUEL S. MATTHEWS, *Primary Examiner.*